G. B. KIRKHAM.
Starting and Propelling Railroad Cars.
No. 111,353. Patented Jan. 31, 1871.
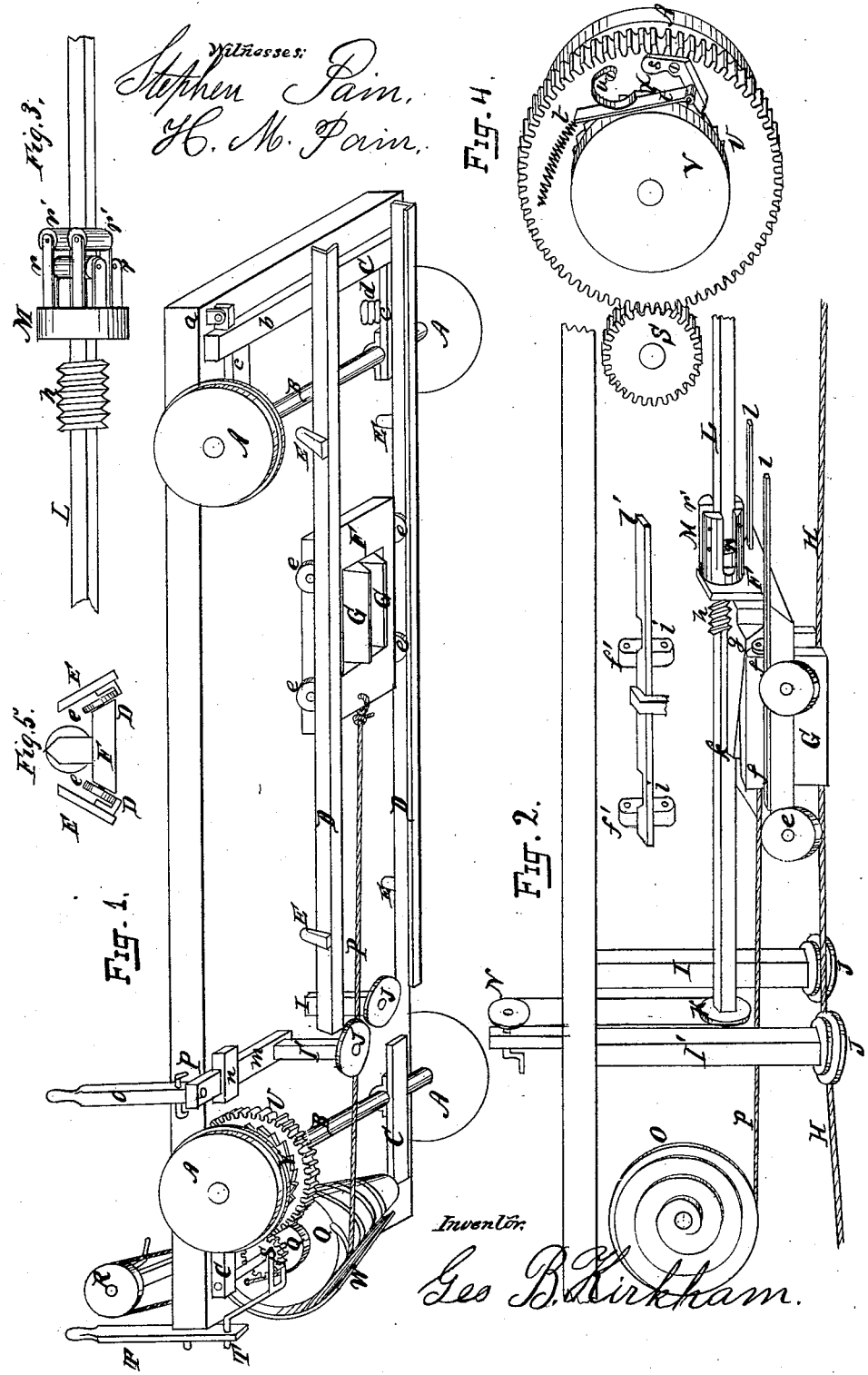

United States Patent Office.

GEORGE BYRON KIRKHAM, OF NEW YORK, N. Y.

Letters Patent No. 111,353, dated January 31, 1871.

IMPROVEMENT IN CAR-STARTERS.

The Schedule referred to in these Letters Patent and making part of the same.

*To all whom it may concern:*

Be it known that I, GEORGE BYRON KIRKHAM, of 167 East Thirty-third street, city, county, and State of New York, have invented a new and useful Improvement for Starting and Propelling Railway-Carriages; and I do hereby declare the following to be a full, clear, and exact description of the same, sufficient to enable one skilled in the art to which the invention appertains to make use of it, reference being had to the accompanying drawing which forms a part of this specification, and in which—

Figure 1 represents a general view in perspective of the improvement, as seen from below the carriage or railway-car.

Figure 2 represents the small truck F with its accessories, the main cable H, the cone-wheel O, and the sliding wheel M, with its accessories Y, L, K, and N.

Figure 3 represents the sliding wheel M and bar L, with their adjustants Y and r r′, &c.

Figure 4 shows the wheels S U V X and their accessories s t u.

Figure 5 shows an end view of the truck F and rails D D.

Heretofore, when it has been necessary to propel railway-cars by means of wire ropes or endless cables, it has been difficult to find a suitable apparatus for starting the cars gradually, and for attaching and detaching the cars readily from the cable. It is the purpose of my invention to furnish such an apparatus.

In railroads where the cars are pulled along by endless chains or cables it has usually been managed by first attaching the car to the cable while both are at rest, and then starting the whole gradually.

In this invention it is proposed to run the cable continually at a rapid rate—from four to twenty miles an hour, or, perhaps, even faster—and never to stop or retard the cable, except for repairs. The cars will catch on the cable, be started gradually, and be drawn along, while they can be disengaged with equal facility from the swiftly-running cable.

In fig. 1 is seen an ordinary platform-car, with four flanged wheels, A A A A, to run on a common track. The track and main cable are not shown, as they would obstruct the view of the other parts.

The car may, of course, have any number of wheels, and these wheels A A, &c., may or may not be coupled together by means of belts, endless chains, or rods, as the driving-wheels of a locomotive are made to move together.

Each pair of wheels has a common axle, B, and their bearings are held to and support the car by a peculiar arrangement, as shown at C.

A timber, b, has two hinges, one of which is seen at a, by means of which it is held firmly to the car, and two short arms, c c, to which the journals of the axle B are secured.

Between the short arms c c two or more springs are inserted, as shown at d.

The whole forms a truck which is reliable, and yet with a good deal of elasticity to it.

If it is necessary for the carriage to go around curves, the hinges a a would have to be inserted in a large turn-piece, of metal or wood, which could turn on a pivot in the center, like an ordinary four-wheeled car-truck.

On the under side of the car two rails, D D, are attached to it by posts E E E E.

The rails are for the small car or truck F to run on. They are L-shaped and have an inward slant, as shown at fig. 5, thus preventing the wheels e e e e from jumping upward, as they would otherwise be liable to do when the jaws G G seize the main cable. It also enables larger wheels to be used than there would be room for if they stood upright.

These jaws G G are pivoted at each end, as shown at f f, fig. 2.

They are made to grip the wire cable H H by means of a wedge, g, which is forced between the tops of the jaws, or withdrawn, by a screw, h, which forms part of the bearing M, (seen also in fig. 3.)

The piece M h is held in position by the shoulder j, which projects from F.

The screw-piece h M has four little rollers, r r r′ r′, which bear against the square bar L, passing through h M. These rollers r r′ allow the piece h M to slide freely back and forth on the bar L, while at the same time they compel the screw h to turn with the bar L.

At the end of the bar L is a wheel, K, and connected with it, by a belt, a wheel and crank-handle, N, by which it is operated.

At the back end of the truck F is a rope, P, which is wound on a cone-wheel, O.

This cone-wheel O has a grooved wheel, Q, connected with it, moved by a belt leading from the wheel and crank R, by means of which the operator can wind up the rope P on the cone-wheel.

On the same axle with O and Q is a pinion, S, which, by means of the lever T and rod T′, can be thrown in and out of gear with the wheel U on the axle B of the two car-wheels A A. The wheel U turns freely on the axle B, but is made to turn the wheels A A by an arrangement shown in fig. 4.

The two wheels V X are rigidly fastened on the axle B and when U is turned in one direction the balanced pawl s, which is pivoted to U, is brought by its bearing t, which is pressed against V by the springs u u, down into the ratched cogs of X; but when the wheel U is turned in the opposite direction, the bearing $t$ raises the pawl $s$ from the ratchet-wheel X, and thus prevents the terrible noise that a pawl always makes when sliding over the cogs of a ratchet-wheel.

Two wheels, J J, (figs. 1 and 2,) are placed diagonally, so as to sustain the wire cable H.

These wheels J J are held by posts I I', and one of them, I', has a sliding bar, $m$, to which it is fastened, moving through the clasp $n$ and operated by the lever $o$, rocking on the pin $p$. This arrangement allows the wheels J J to take up or drop the wire cable H whenever it is necessary to do so.

On the truck F (fig. 2) are two bars, $l\ l$, which hold the pivots $f'\ f'$ of the jaws G G in their proper positions; but if, by collision with any object on the track the bars $l\ l$ are driven back, the pivots (see $f'\ f'\ l'\ l'$) will fall into depressions in the bars $l\ l$, and thus loosen the hold of the jaws G G on the cable H.

A shield, W, covers the cone-wheel O, to make the rope P wind on O smoothly.

Before starting the car the rope P is wound entirely on the cone-wheel O, and the truck F is drawn to that end of the car; then, by means of the crank-wheel N and the cord I, the bar L and screw M $h$ are turned. The screw $h$ forces the wedge $g$ between the jaws G G, causing them to grip the wire cable H. The moment they do so the truck F is carried along on the tracks D D, by the motion of H, toward the forward end of the car; but while it is doing so the rope P is unwinding from the cone-wheel O, first from the largest end of the cone. This starts the car very slowly at first, but as the rope P nears the small end of the cone O the wheels A A run faster and faster until they equal the velocity of H.

And now having described my invention,

What I claim therein as new, and desire to secure by Letters Patent, is—

1. The rails D D and posts E E, as represented and for the purpose set forth.

2. The truck F, with its wheels $e\ e\ e\ e$, in combination with the nippers G G, wedge $g$, screw $h$, bars $l\ l$, pivots $f\ f$, and lips $i\ f'$, as represented and for the purpose set forth.

3. The wheels J J, in combination with the posts I I', levers $m$ and $o$, and slide $n$, as represented and for the purpose set forth.

4. The wheel U, in combination with the wheel S, lever T, and rod T', as represented and for the purpose set forth.

5. The combination of the wheels V X, pawl $s$, bar $t$, and springs $n\ n$, as represented and for the purpose set forth.

GEO. B. KIRKHAM.

Witnesses:
STEPHEN PAIN,
H. M. PAIN.